(12) United States Patent
McFadden et al.

(10) Patent No.: US 7,988,194 B2
(45) Date of Patent: Aug. 2, 2011

(54) AIRBAG APPARATUS

(75) Inventors: Stephanie Marie McFadden, Oxford, MI (US); Paul Alan Baker, Royal Oak, MI (US)

(73) Assignee: TK Holdings Inc., Auburn Hills, MI (US)

( * ) Notice: Subject to any disclaimer, the term of this patent is extended or adjusted under 35 U.S.C. 154(b) by 114 days.

(21) Appl. No.: 12/385,141

(22) Filed: Mar. 31, 2009

(65) Prior Publication Data

US 2009/0236839 A1  Sep. 24, 2009

Related U.S. Application Data

(63) Continuation-in-part of application No. 12/149,347, filed on Apr. 30, 2008, which is a continuation-in-part of application No. 11/523,810, filed on Sep. 20, 2006.

(60) Provisional application No. 61/193,111, filed on Oct. 29, 2008.

(51) Int. Cl.
  *B60R 21/23* (2006.01)
(52) U.S. Cl. .................. 280/743.2; 280/743.1
(58) Field of Classification Search ............... 280/743.2, 280/743.1
  See application file for complete search history.

(56) References Cited

U.S. PATENT DOCUMENTS

| | | | |
|---|---|---|---|
| 5,213,361 A | 5/1993 | Satoh et al. | |
| 5,280,953 A | 1/1994 | Wolanin et al. | |
| 5,405,166 A | 4/1995 | Rogerson | |
| 5,468,013 A | 11/1995 | Gille | |
| 5,489,119 A * | 2/1996 | Prescaro et al. | 280/743.2 |
| 5,501,488 A | 3/1996 | Saderholm et al. | |
| 5,513,879 A | 5/1996 | Patel et al. | |
| 5,560,649 A | 10/1996 | Saderholm et al. | |
| 5,568,938 A * | 10/1996 | Lindstrom | 280/743.2 |
| 5,603,526 A | 2/1997 | Buchanan | |
| 5,704,639 A | 1/1998 | Cundill et al. | |
| 5,853,191 A | 12/1998 | Lachat | |
| 5,931,497 A | 8/1999 | Fischer | |
| 6,139,052 A | 10/2000 | Preamprasitchai | |
| 6,247,726 B1 | 6/2001 | Ryan | |
| 6,308,983 B1 | 10/2001 | Sinnhuber | |
| 6,334,627 B1 * | 1/2002 | Heym et al. | 280/743.2 |
| 6,648,371 B2 | 11/2003 | Vendely et al. | |
| 6,659,499 B2 | 12/2003 | Jenkins | |
| 6,669,231 B2 | 12/2003 | Ryan | |
| 6,676,158 B2 | 1/2004 | Ishikawa | |
| 6,722,691 B1 * | 4/2004 | Håland et al. | 280/730.1 |
| 6,746,045 B2 | 6/2004 | Short et al. | |
| 6,773,030 B2 | 8/2004 | Fischer | |

(Continued)

FOREIGN PATENT DOCUMENTS

JP  09-142239 A  3/1997

(Continued)

*Primary Examiner* — Ruth Ilan
*Assistant Examiner* — George D. Spisich
(74) *Attorney, Agent, or Firm* — Foley & Lardner LLP

(57) ABSTRACT

An airbag apparatus for protecting an occupant of a vehicle comprises an inflatable chamber formed by at least one fabric panel and configured to be filled with an inflation gas and deploy into position to protect the occupant; and a tether connected to the panel to restrain deployment of the airbag. During the initial deployment sequence of the airbag, the tether fully extends to a first length. The tether unfolds in order to fully extend to a second length when a sufficient force is applied to the tether by the deploying airbag.

9 Claims, 5 Drawing Sheets

U.S. PATENT DOCUMENTS

| | | | |
|---|---|---|---|
| 6,796,583 B2 | 9/2004 | Keshavaraj | |
| 6,799,777 B2 | 10/2004 | Hawthorn et al. | |
| 6,830,265 B2 | 12/2004 | Ford | |
| 6,832,778 B2 | 12/2004 | Pinsenschaum et al. | |
| 6,834,886 B2 | 12/2004 | Hasebe et al. | |
| 6,869,101 B2 | 3/2005 | White et al. | |
| 6,918,613 B2 | 7/2005 | Short et al. | |
| 6,932,385 B2 | 8/2005 | Hawthorn et al. | |
| 6,945,559 B2 | 9/2005 | Kassman et al. | |
| 6,959,945 B2 | 11/2005 | Fischer et al. | |
| 6,991,258 B2 | 1/2006 | Hawthorn et al. | |
| 7,000,943 B2 | 2/2006 | Hasebe et al. | |
| 7,134,691 B2 * | 11/2006 | Dunkle et al. | 280/743.2 |
| 7,264,268 B2 | 9/2007 | Ehrke | |
| 7,314,228 B2 * | 1/2008 | Ishiguro et al. | 280/728.2 |
| 7,334,812 B2 | 2/2008 | Abe | |
| 7,445,237 B2 | 11/2008 | Boyle, III et al. | |
| 7,497,469 B2 | 3/2009 | Fischer et al. | |
| 7,793,978 B2 * | 9/2010 | Vigeant et al. | 280/743.2 |
| 2001/0033072 A1 | 10/2001 | Kumagai et al. | |
| 2001/0035639 A1 * | 11/2001 | Amamori | 280/740 |
| 2002/0175511 A1 * | 11/2002 | Dunkle et al. | 280/743.2 |
| 2003/0218325 A1 | 11/2003 | Hasebe et al. | |
| 2004/0012180 A1 | 1/2004 | Hawthorn et al. | |
| 2004/0017069 A1 | 1/2004 | Fischer | |
| 2004/0051285 A1 | 3/2004 | Fischer | |
| 2004/0051286 A1 | 3/2004 | Fischer et al. | |
| 2004/0056459 A1 | 3/2004 | Kassman et al. | |
| 2004/0145160 A1 | 7/2004 | Hasebe et al. | |
| 2004/0145161 A1 | 7/2004 | Hasebe et al. | |
| 2004/0150200 A1 | 8/2004 | Yamada et al. | |
| 2004/0155439 A1 | 8/2004 | Hasebe et al. | |
| 2004/0155440 A1 | 8/2004 | Hasebe et al. | |
| 2004/0155443 A1 | 8/2004 | Ford | |
| 2004/0160041 A1 | 8/2004 | Hasebe et al. | |
| 2004/0188990 A1 | 9/2004 | Short et al. | |
| 2005/0029781 A1 | 2/2005 | Enders et al. | |
| 2005/0040634 A1 | 2/2005 | Braun et al. | |
| 2005/0040635 A1 | 2/2005 | Hawthorn et al. | |
| 2005/0057030 A1 * | 3/2005 | Fischer et al. | 280/743.2 |
| 2005/0098990 A1 | 5/2005 | Pinsenschaum et al. | |
| 2005/0104339 A1 | 5/2005 | Hasebe et al. | |
| 2005/0110249 A1 | 5/2005 | Hasebe et al. | |
| 2005/0127648 A1 | 6/2005 | Fischer et al. | |
| 2005/0146122 A1 | 7/2005 | Gould et al. | |
| 2005/0161918 A1 | 7/2005 | Bito | |
| 2005/0184489 A1 | 8/2005 | Kobayashi | |
| 2005/0194769 A1 | 9/2005 | Abe | |
| 2005/0236822 A1 | 10/2005 | Rose et al. | |
| 2005/0248137 A1 | 11/2005 | Delventhal et al. | |
| 2006/0125215 A1 | 6/2006 | Clarke et al. | |
| 2006/0125219 A1 | 6/2006 | Kokeguchi et al. | |
| 2006/0181067 A1 | 8/2006 | Maripudi | |
| 2006/0237953 A1 * | 10/2006 | Abe | 280/729 |
| 2007/0108750 A1 | 5/2007 | Bauer et al. | |
| 2007/0132222 A1 * | 6/2007 | Thomas et al. | 280/743.2 |
| 2007/0145729 A1 | 6/2007 | Ishiguro et al. | |
| 2007/0152435 A1 * | 7/2007 | Jamison et al. | 280/743.2 |
| 2007/0182144 A1 * | 8/2007 | Aranzulla et al. | 280/743.2 |
| 2007/0210568 A1 * | 9/2007 | Thomas et al. | 280/743.2 |
| 2008/0073892 A1 | 3/2008 | Rose et al. | |
| 2008/0179866 A1 | 7/2008 | Maertens | |

FOREIGN PATENT DOCUMENTS

| | | |
|---|---|---|
| JP | 2005-014861 A | 1/2005 |
| JP | 2005-014862 A | 1/2005 |
| JP | 2005-014863 A | 1/2005 |
| JP | 2005-014864 A | 1/2005 |

* cited by examiner

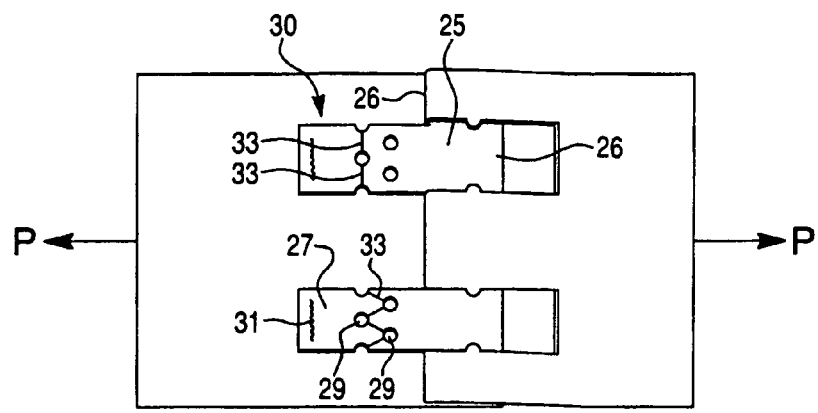
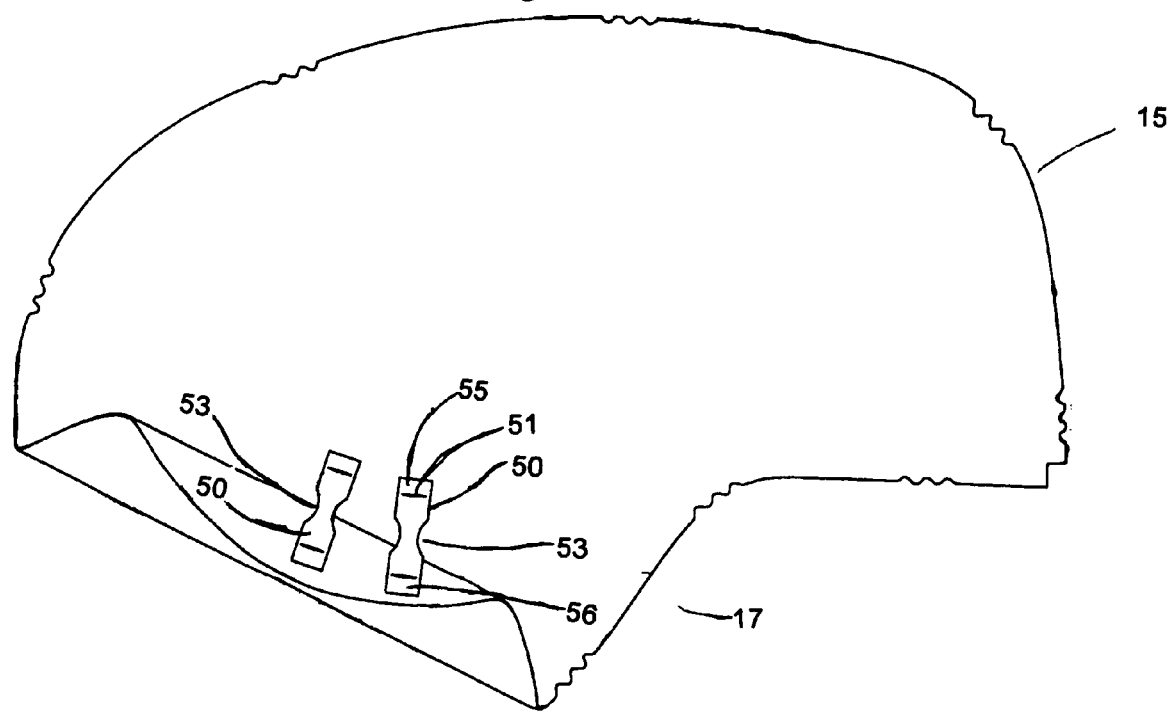

US 7,988,194 B2

AIRBAG APPARATUS

CROSS-REFERENCE TO RELATED PATENT APPLICATIONS

This application is a Continuation-In-Part of U.S. patent application Ser. No. 12/149,347, filed Apr. 30, 2008, which is a Continuation-In-Part of U.S. patent application Ser. No. 11/523,810, filed Sep. 20, 2006, both of which are incorporated herein by reference in their entirety. This application also claims the benefit of and priority to U.S. Provisional Patent Application No. 61/193,111, filed Oct. 29, 2008. The foregoing provisional application is incorporated herein by reference in its entirety.

BACKGROUND

The present application relates generally to the field of airbags for use within motor vehicles. More specifically, the application relates to a tension tether configured with a delay mechanism used to improve occupant protection by tailoring deployment trajectory of the airbag.

The deployment trajectory of an airbag is critical to its effectiveness to provide protection to an occupant during a dynamic impact by a vehicle. Conventional airbag systems have been constructed for the primary purpose to provide protection to in-position occupants. Other conventional airbags have been constructed using active and passive means of occupant detection for the secondary purpose to provide improved protection to an out-of-position (OOP) occupant or a rearward facing infant seat (RFIS). One such construction is constructed with a passive venting system, which allows gas to escape the airbag when it encounters an OOP occupant or a RFIS during deployment to mitigate the impact force, otherwise the passive venting system contains the gas and allows for the cushion to continue expanding to protect an in position occupant.

It has been known to provide fixed tethers, both internal and external to the airbag cushion, to aid the trajectory of an airbag during deployment. It has also been known to couple the tether to the airbag or to other vehicle components in providing such support.

SUMMARY

Based on the foregoing, it is desirable for an airbag apparatus to provide a tailored airbag profile or trajectory that protects both OOP and RFIS during a low risk deployment and also protects in position occupants by providing a standard cushion profile. It would be advantageous to provide this flexible cushion profile in a cost effective and reliable manner.

One disclosed embodiment relates to an airbag apparatus for controlling the trajectory of an airbag cushion. The apparatus includes an inflatable chamber formed by at least one fabric panel and configured to be filled with an inflation gas and deploy into position to protect the occupant; and a restraining tab connected to the panel to restrain deployment of the airbag. The restraining tab is configured to separate in a controlled manner when sufficient force is applied to it by the deploying airbag.

Another disclosed embodiment relates to an airbag apparatus for protecting an occupant of a vehicle. The apparatus includes an airbag for protecting a vehicle occupant, wherein the airbag is configured to be filled with inflation gas and deploy into a position for protecting the occupant; and a tether connected to the airbag and configured to restrain deployment of the airbag. Prior to deployment of the airbag, the tether is configured to extend to a first length. The tether includes a tear section configured to tear to thereby allow the tether to extend to a second length and wherein the second length is longer than the first length. The tether unfolds when the tear section tears.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 2b is a top view of the tether of FIG. 1a.

FIG. 3 is a detail view taken from FIG. 2a, illustrating the construction of the delay mechanism of the tether.

FIG. 4 is a side view of another embodiment of an airbag panel having restraining tabs.

DETAILED DESCRIPTION

Figure 1A:
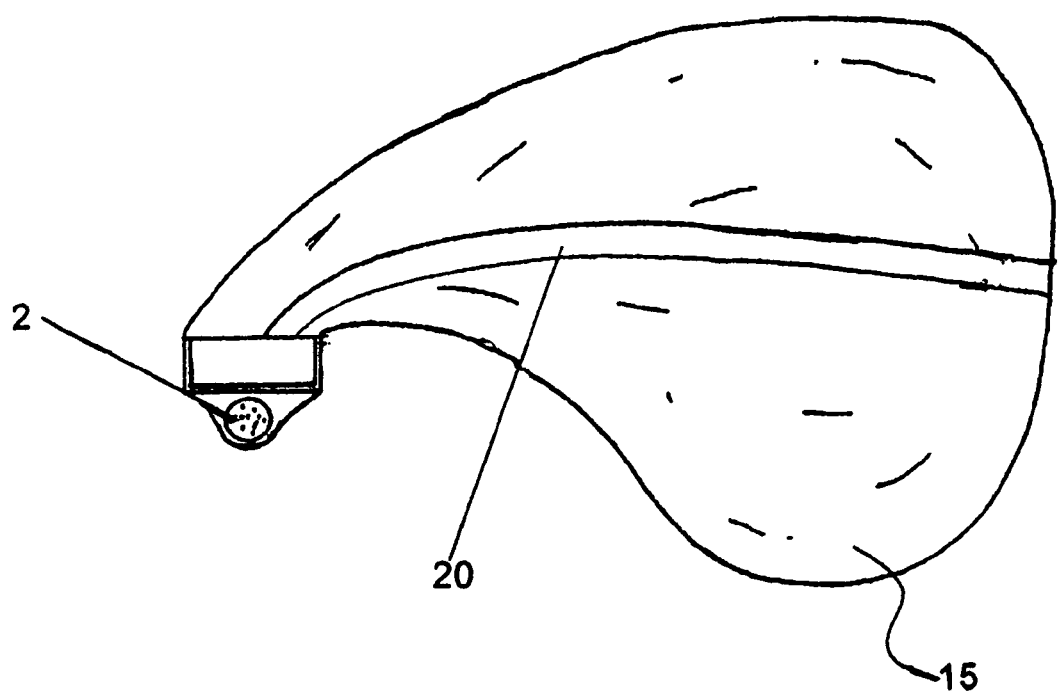
FIG. 1a is a cross sectional side view of an airbag system with a tether.

As shown in FIG. 1a, the airbag apparatus includes an airbag 15 and a tether 20. An inflator 2 inflates a chamber of the airbag 15 with inflation gas to deploy the airbag into position to protect an occupant.

During deployment of the airbag 15 when an OOP occupant or rear facing child seat is not present, the airbag 15 trajectory may be tailored by the tether 20 by allowing for continued expansion of the airbag 15 until a force is applied to the tether 20. When a force is applied to the tether 20, the tether 20 restricts further expansion of the airbag 15 until a predetermined force is reached, whereby the tether 20 tears, allowing the airbag 15 to continue expanding. The force may be a tensile force on the tether.

When an OOP occupant or a rear facing child seat is present, the airbag 15 expands until contact occurs between the airbag 15 and the OOP occupant or rear facing child seat, then the airbag 15 remains uniform as the tether 20 is not subjected to the predetermined tension force.

Figure 1B:
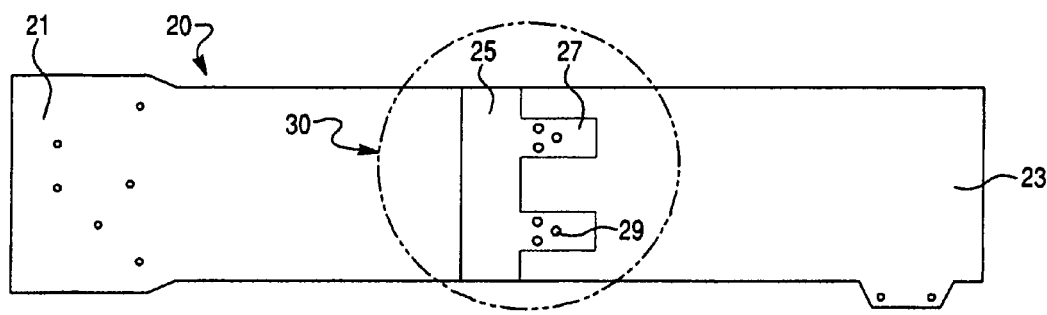
FIG. 1b is a top view of an exemplary embodiment of a tether for use in an airbag system.
Figure 1C:
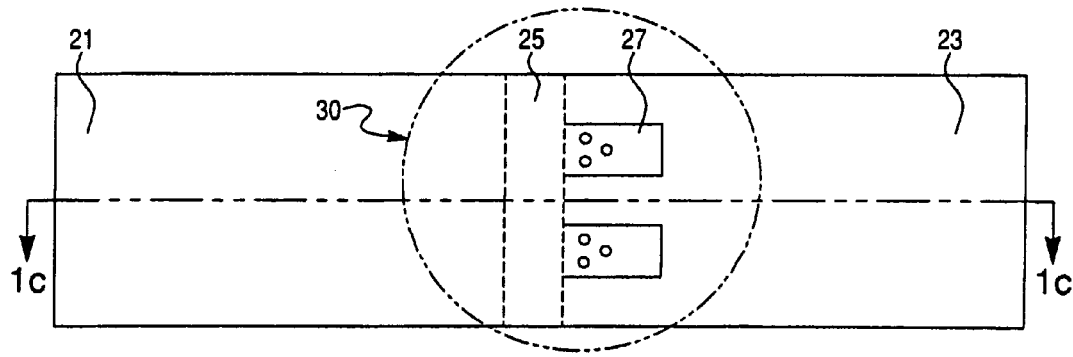
FIG. 1c is a top view of the tether shown in FIG. 1b.
Figure 1D:
FIG. 1d is a cross-section taken along line 1c of FIG. 1c.

FIGS. 1b-1d show a first embodiment of the tether 20. The tether 20 includes a first end 21, a second end 23, a folded portion 25, and a region of the tether 20 including a delay mechanism 30. The tether 20 may be substantially rectangular in shape as shown or some other useful shape. The delay mechanism 30 may include one or more sections of the tether 20 that are designed to tear to allow the tether 20 to unfold and extend in length. These tearable or weakened sections 27 may be integrated into the tether 20 or alternatively be provided as separate strips, bands or pieces of fabric. For example, the weakened sections 27 may be cut out of the tether 20 and may form a rectangular shape as shown. Alternatively, the weakened sections 27 may be constructed in another suitable shape based on the airbag 15 or tether 20 design. For example, the weakened section 27 may be a tapered section having a having a width that is narrower than the first end 21 and the second end 23.

The tether 20 may be coupled to an airbag 15, internally or externally. In one embodiment, the first end 21 may be coupled to the trailing edge and the second end 23 may be coupled to the leading edge. The trailing edge is the edge or end farthest from the occupant which remains substantially fixed during deployment, of the airbag 15. The leading edge is the edge or end closest to the occupant which expands toward the occupant during deployment of the airbag 15. The tether 20 may be made out of any conventional or other useful material. For example, the tether 20 may be made out of nylon 6-6 fabric.

In FIGS. 2a-2d, the exemplary embodiment of the tether 20 of FIG. 1a is shown including a delay mechanism 30. The delay mechanism 30 may include a folded portion 25, two creases 26, the weakened section 27, a plurality of voids 29, and a coupling means 31. There may be multiple folded portions 25. There may also be more than two creases 26 and weakened sections 27.

The folded portion 25 is constructed by taking the tether 20 and folding the tether 20 into a useful shape, which creates two creases 26, one on each end of the folded portion 25. As shown in FIG. 2c, the useful shape may be a z-shape fold. Other useful shapes are also possible. The length of the material folded into the folded portion 25 may be tailored to the specific requirements of a vehicle or to control the additional deployment distance following the delay. For example, for different sized passenger compartments, the length of material in the folded portion 25 may be increased or decreased to control proper trajectory of the airbag 15 during airbag 15 deployment.

According to one exemplary embodiment, the airbag 15 as shown in FIGS. 1a-2d may be modified to tailor its trajectory by providing a series of or sequence of delays in deployment. For example, the tether may include multiple z-shaped folds, each fold being located on top of an adjacent fold and each fold including a delay mechanism 30. The deployment of the airbag 15 may take place in a series of steps. Each delay mechanism 30 may be configured to release or give way when a specific tensile force is applied to the tether. The weakened section 27 may extend beyond one end of the tether 20 with its base being proximate to one crease 26 and be coupled to the other end of the tether 20 by the coupling means 31. For example, as shown in FIG. 2a, the weakened section 27 may extend beyond the second end 23 of the tether 20 with its base being proximate to one crease 26 and coupled to the second end 21 of the tether 20 by the coupling means 31. The coupling means 31 may be any conventional method of coupling. For example, the coupling means 31 may be a stitched seam. The portion of the weakened section 27 coupled to the tether 20 does not change position when the tether 20 unfolds.

Figure 2A:
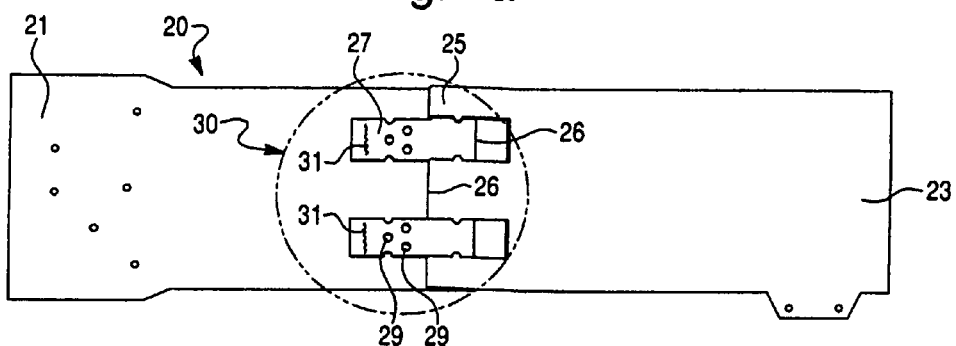
FIG. 2a is a top view of the tether of FIG. 1a, constructed to include a delay mechanism.
Figure 2B:
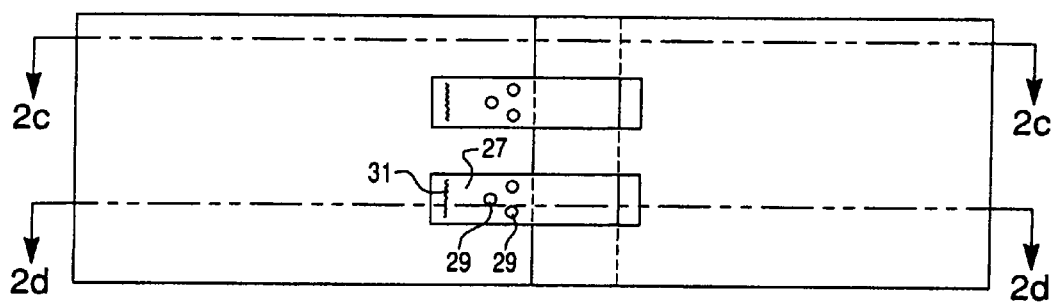
Figure 2C:
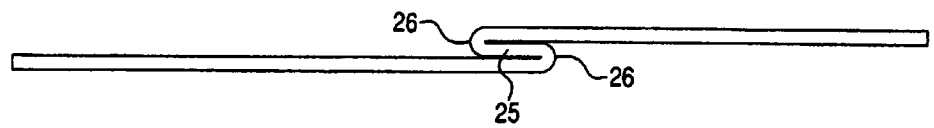
FIG. 2c is a cross-section taken along line 2c of FIG. 2b.
Figure 2D:
FIG. 2d is a cross-section taken along line 2d of FIG. 2b.

As shown in FIG. 2a, the tether 20 may be modified to include a delay mechanism 30 having two weakened sections 27. In the alternative, the delay mechanism 30 may have one weakened section 27 or more than two weakened sections 27. The number of weakened sections 27 and the tear strength of each weakened section 27 may be constructed to respond to a specific tension force that is exerted on the tether 20 during the deployment of the airbag 15 in order to tailor deployment of the airbag based on several factors such as, for example, the vehicle, the vehicle seat, mounting location of the airbag, etc. Additionally, other useful shapes may be utilized in constructing the delay mechanism 30 to tailor the deployment and deployment trajectory of the airbag 15.

According to yet another embodiment, a multiple delay system may be constructed that has more than one weakened section 27. A multiple delay system may include two weakened sections 27. One of the two weakened sections 27 may be more resistant to tearing than the other weakened section. As a result, the time for the first weakened section to tear will be greater than the time required for the other weakened section to tear. For example, the weakened section 27 may be coupled so that a tension force is not experienced by the section until a tension force applied to the other weakened section causes the shorter weakened section 27 to tear. As the airbag 15 deploys, the expansion of the airbag 15 exerts tension on the first weakened section, delaying further expansion of the airbag 15, until the first weakened section tears. When the first weakened section 27 tears, the airbag 15 continues expanding until a predetermined tension force is applied to the second weakened section. The second delay occurs as the tension force applied to the second weakened section reaches a predetermined force, whereby the second weakened section tears. When the second weakened section tears, the airbag 15 may continue to deploy.

An airbag 15 may be designed with a varying amount of weakened sections 27 to accommodate varying customer requirements or specifications. Meeting the accommodations ensures that optimal protection is provided to an out of position occupant or to a rearward facing child seat.

FIG. 3 shows an exemplary embodiment of the delay mechanism 30 of the tether 20, as previously shown in FIGS. 2a-2d, in more detail. Each weakened section 27 may be constructed with a plurality of voids 29, which create tear sections 33. The tear sections 33 may be a variety of shapes. The shape of the tear section 33 may be dependent on the desired strength of the delay mechanism 30. When a predetermined force P is applied along the longitudinal axis of the tether 20, the weakened section 27 tears through the tear sections 33. The continued application of force P, allows the folded portion 25 of the airbag to unfold, thereby allowing expansion of the airbag 15 to resume. The predetermined force P may be tailored to meet specific requirements of the airbag deployment by controlling the length of the tear sections 33 or by controlling the size and quantity of the voids 29. The coupling means 31 is configured to be a structural attachment method such as, for example, a stitched seam. Alternatively, the weakened sections 27 may be integrated into the tether.

The tear sections 33, as illustrated in FIG. 3, may be designed to tear in varying ways. As shown in FIG. 3, a first embodiment of a weakened section 27 includes tear sections 33 which run substantially laterally between a series of voids 29 in a direction generally perpendicular relative to the primary direction of the tensile force applied to the tether. According to a alternative embodiment, also shown in FIG. 3, the weakened section 27 may include tear sections 33 which extend between the voids 29 in a generally diagonal direction relative to the direction of the tensile force P applied to the tether.

The tether 20 may include a fabric pattern where the weakened section 27 is integrated into the fabric pattern. The fabric pattern or weave pattern may be constructed at an angle to the longitudinal axis of the tether 20. The angled weave pattern facilitates the tearing of the fibers through tear sections 33 when a predetermined force is applied to the tether 20, by allowing for initiation and propagation of the tear. The angle may, for example, be a 45 degree angle. Other angles are also possible.

Figure 5:
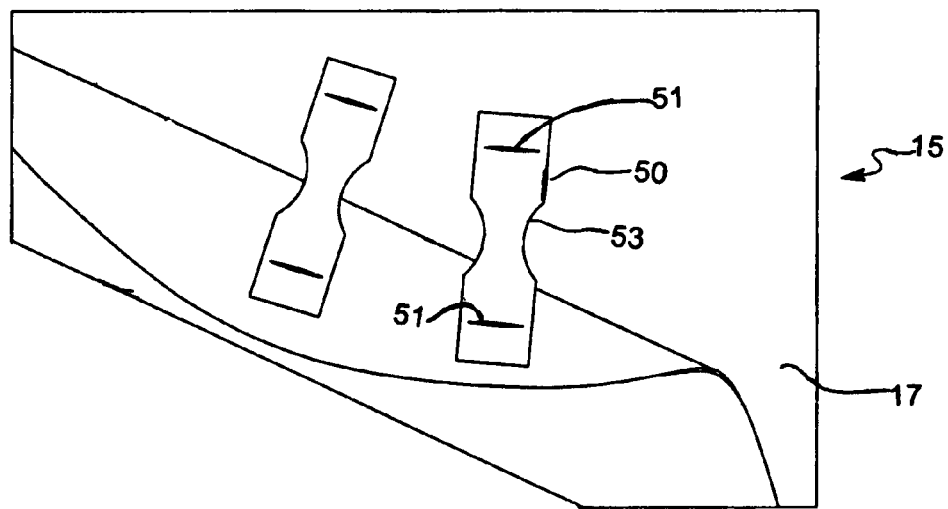
FIG. 5 is a detail view taken from FIG. 5, illustrating both ends of each restraining tab coupled to the inside of an exemplary airbag panel.
Figure 6:
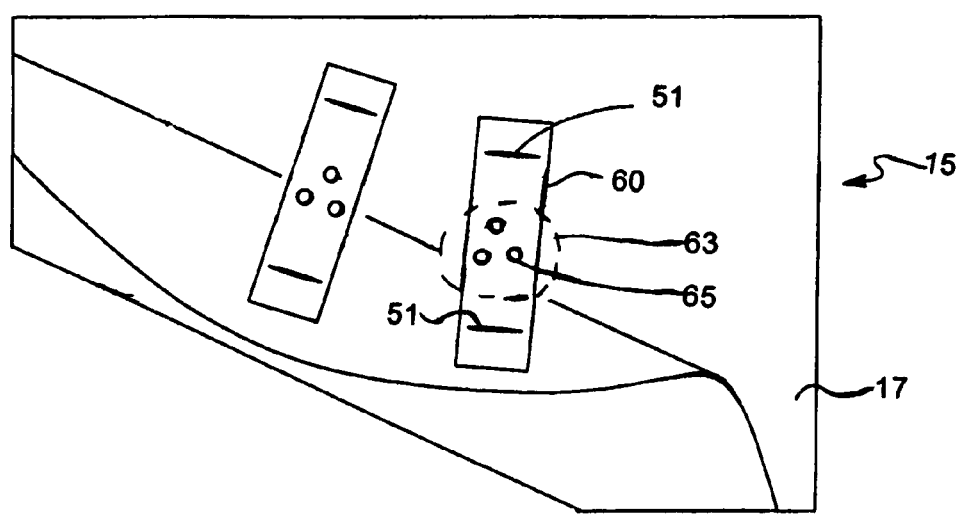
FIG. 6 is a side view of a variation of the airbag panel shown in FIGS. 4-5 having restraining tabs.

FIGS. 4-6 disclose an alternative embodiment of an inflatable airbag 15. The airbag 15 may include two panels 17 sewn together to form an inflatable chamber. The deployment of the airbag 15 may be restrained by restraining tabs 50. The restraining tabs 50 may prevent unfolding of the airbag 15 until a predetermined force is applied to the airbag 15 and correspondingly to the retraining tabs 50.

As shown in FIGS. 4-5, the first end 55 of the restraining tab 50 may be coupled to the inside of one or both of the airbag panels 17 through a conventional coupling means or mechanism 51 such as, for example, a stitched seam 51. The restraining tabs may be attached at one or more locations along either or both of the airbag panels 17.

The restraining tabs 50 may each be constructed with a weakened section 53 being narrower in width than the first end 55 and the second end 56 of each restraining tab 50. Each weakened section 53 may have other shapes. For example, each restraining tab 50 may have a tensile bar, "dog bone" or hourglass shape, where the weakened section 53 is the narrower part of the restraining tab 50.

The tear section 53 may be constructed to tear at a predetermined tensile force applied to the restraining tab 50, which may be tailored to a specific vehicle or airbag 15 design requirement. During deployment of the airbag 15, the airbag panel 17 will expand until a force is applied to the restraining tabs 50. Then deployment of the airbag 15 may be delayed for the required period of time. The delay may be used to provide improved protection to an out of position occupant or a rearward facing child seat, or the delay may provide improved trajectory during deployment to improve protection to an in position occupant. The delay time may be tailored by modifying the geometry, material or material properties of the restraining tab 50. For example, the thickness, tearing section, or fabric weave orientation of the restraining tab 50 may be altered.

The restraining tabs 50 shown in FIGS. 4-5, may be constructed so that a tear line through the restraining tab is positioned at a 45 degree angle to the fabric pattern or weave pattern of the restraining tabs 50. The 45 degree weave pattern facilitates the tearing of the fibers through tear section 53 when a predetermined force is applied to the restraining tab 50, by allowing for initiation and propagation of the tear. While other embodiments may be constructed using a different weave angle, the 45 degree weave offers good reliability to ensure that a predetermined force or tensile force will induce tearing of the restraining tabs 50. According to an alternative embodiment, the tear line extends in a direction at a 90 degree angle to the fabric or weave pattern of the restraining tab. The width of the weakened section 53 as well as the overall geometry of the restraining tabs 50 may vary to achieve properties required to accommodate specific customer or vehicle requirements.

According to another embodiment, as shown in FIG. 6, the restraining tabs 60 may include a plurality of holes 65, instead of having a weakened section 53 with a width that is narrower than the first section 55 and the second section 56 as shown in FIGS. 4-5. The plurality of holes 65 creates a weakened section 63. The plurality of holes 65 may allow for initiation and propagation of a tear, thereby causing the weakened section 63 to tear.

The restraining tabs 60 shown in FIG. 6, may be constructed so that a tear line through the restraining tab is positioned at a 90 degree angle to the longitudinal axis of the restraining tabs 60. The orientation of the tear line relative to the weave pattern facilitates the tearing of the fibers through tear section 63 when a predetermined force is applied to the restraining tab 60, by allowing for initiation and propagation of the tear. The number and orientation of the holes 65 may be varied along with as the overall geometry of the restraining tabs 60 in order to achieve properties required to accommodate specific vehicle requirements.

According to yet another embodiment (not shown), the coupling means may give way to allow deployment of the airbag 15 when a predetermined force is applied to the restraining tabs. The coupling means may be a structural attachment mechanism.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag apparatus for protecting an occupant of a vehicle, wherein the apparatus comprises:
    an inflatable chamber formed by at least one fabric panel and configured to be filled with an inflation gas and deploy into position to protect the occupant; and
    a folded tether connected to the panel to restrain deployment of the airbag,
        wherein the tether includes first and second sections that form a mechanism for delaying the unfolding of the tether when the airbag is inflated, each section having two ends and being integrated with the tether at one end and connected to the tether at the other end, wherein the first section and the second section each include a weakened section, and wherein the weakened sections are configured to tear simultaneously when a sufficient force is applied to the tether thereby allowing the tether to unfold.

2. The apparatus of claim 1, wherein each of the weakened sections have a narrower width than the other end of each of the sections.

3. The apparatus of claim 1, further comprising a plurality of tethers.

4. The apparatus of claim 1, wherein the weakened section of at least one of the first and second sections includes two voids and a tear section that extends substantially laterally between the two voids in a direction substantially perpendicular to a direction of the force applied to the weakened section.

5. The apparatus of claim 1, wherein the weakened section of at least one of the first and second sections includes two voids and a tear section that extends substantially diagonally between the voids in a direction substantially diagonal to a direction of the force applied to the weakened section.

6. An occupant restraint apparatus, comprising:
an airbag for protecting a vehicle occupant, wherein the airbag is configured to be filled with inflation gas and deploy into a position for protecting the occupant; and
a folded tether connected to the airbag and configured to restrain deployment of the airbag, wherein
wherein the tether includes first and second sections that form a mechanism for delaying the unfolding of the tether when the airbag is inflated, each section having two ends and being integrated with the tether at one end and connected to the tether at the other end, wherein the first section and the second section each include a weakened section, and wherein the weakened sections are configured to tear simultaneously when a sufficient force is applied to the tether thereby allowing the tether to unfold.

7. The apparatus of claim 6, wherein each of the weakened sections have a narrower width than the other end of each of the sections.

8. The apparatus of claim 6, wherein the weakened section of at least one of the first and second sections includes two voids and a tear section that extends substantially laterally between the two voids in a direction substantially perpendicular to a direction of the force applied to the weakened section.

9. The apparatus of claim 6, wherein the weakened section of at least one of the first and second sections includes two voids and a tear section that extends substantially diagonally between the voids in a direction substantially diagonal to a direction of the force applied to the weakened section.

* * * * *